United States Patent
Fuerst et al.

(10) Patent No.: US 8,270,612 B2
(45) Date of Patent: Sep. 18, 2012

(54) MAPPING COMPOUND KEYS

(75) Inventors: Karl Fuerst, Wiesloch (DE); Florian Kresser, Lobbach (DE); Holger Gockel, Speyer (DE)

(73) Assignee: SAP AG, Walldorf (DE)

( * ) Notice: Subject to any disclaimer, the term of this patent is extended or adjusted under 35 U.S.C. 154(b) by 1060 days.

(21) Appl. No.: 11/612,427

(22) Filed: Dec. 18, 2006

(65) Prior Publication Data

US 2008/0148006 A1    Jun. 19, 2008

(51) Int. Cl.
*H04L 9/00* (2006.01)
(52) U.S. Cl. ........ 380/277; 380/278; 380/279; 380/280; 380/281; 380/282
(58) Field of Classification Search .................... 707/101
See application file for complete search history.

(56) References Cited

U.S. PATENT DOCUMENTS

| | | | |
|---|---|---|---|
| 6,282,509 B1 * | 8/2001 | Miyauchi | 704/10 |
| 6,643,653 B1 * | 11/2003 | Chu | 707/10 |
| 2005/0281468 A1 * | 12/2005 | Clark | 382/232 |
| 2006/0010147 A1 * | 1/2006 | Arras et al. | 707/101 |
| 2006/0031243 A1 * | 2/2006 | Boyle et al. | 707/102 |

* cited by examiner

*Primary Examiner* — Philip Chea
*Assistant Examiner* — Ghazal Shehni
(74) *Attorney, Agent, or Firm* — Mintz, Levin, Cohn, Ferris, Glovsky and Popeo, P.C.

(57) ABSTRACT

Systems and techniques for mapping compound keys. In one aspect, a method includes receiving a first compound key, mapping the first compound key to a first surrogate key, mapping the first surrogate key to a second surrogate key, mapping the second surrogate key to a second compound key, and making the second compound key available for data processing activities.

15 Claims, 7 Drawing Sheets

| | CUSTOMER NUMBER | SALES ORGANIZATION | DISTRIBUTION CHANNEL | ... | PURCHASE ORDER |
|---|---|---|---|---|---|
| 605 | 845 | org1 | dc1 | ... | po222 |
| 610 | 846 | org1 | dc1 | ... | po372 |
| 615 | 846 | org3 | dc6 | ... | po002 |
| 620 | 846 | org3 | dc4 | ... | po555 |
| 625 | 847 | org2 | | ... | po168 |
| 630 | ... | ... | ... | ... | ... |
| 635 | N | orgN | dcN | ... | poN |
| | 640 | 645 | 650 | 655 | 660 |

| COMPOUND KEY | SURROGATE KEY |
|---|---|
| $KC_1\_KC_2\_KC_3$ | $SK_1$ |
| $KC_4\_KC_5$ | $SK_2$ |
| $KC_6\_KC_7\_KC_8$ | $SK_3$ |
| ... | ... |
| $KC_n$ | $SK_n$ |

| KEY COMPONENT | POSITION | KEY COMPONENT | POSITION | KEY COMPONENT | POSITION | SURROGATE KEY |
|---|---|---|---|---|---|---|
| $KC_1$ | 1 | $KC_2$ | 2 | $KC_3$ | 3 | $SK_1$ |
| $KC_4$ | 1 | $KC_5$ | 2 | | | $SK_2$ |
| $KC_6$ | 1 | $KC_7$ | 2 | $KC_8$ | 3 | $SK_3$ |
| ... | ... | ... | ... | ... | ... | ... |
| $KC_n$ | 1 | $KC_m$ | 2 | $KC_o$ | 3 | $SK_n$ |

MAPPING COMPOUND KEYS

BACKGROUND

This disclosure relates to mapping compound keys.

A key is information that identifies a collection of data for data processing activities performed in accordance with a set of machine-readable instructions. The identified data collection can be, e.g., an abstraction of a real-world entity such as a data object, a complex data structure, or a portion of a complex data structure. Examples of complex data structures include, e.g., records, arrays, tables, files, lists, and the like. Portions of complex data structures include, e.g., elements in an array, entries in a list, rows in a table, fields in a record, and the like.

Compound keys (also referred to as "composite keys" or "concatenated keys") are keys that include of two or more components (also referred to as "attributes") that together identify a data assembly. Compound key components are generally ordered. The identification provided by a key or a compound key is generally unambiguous, i.e., each identifier or key generally refers to a single data collection to the exclusion of all other data collections.

A key can include, e.g., a name or a value that identifies the data collection within an identification scheme, a scheme identifier that identifies a frame of reference in which it is possible to identify data collections, and an agency identifier that identifies the entity that defines the identification scheme and issues names for data collections within the identification scheme. Different applications, different modules, different data processing systems, different data processing system landscapes, and different public identification scheme entities (such as Dun & Bradstreet, which issues DUNS numbers, and GS1, which issues GTIN's) can use different agencies and/or schemes, and hence different keys, in referring to identical or related data collections.

When information regarding data collections is exchanged between such different entities, a process called key mapping can be used to translate keys. In general, key mapping involves accessing a key mapping database where keys used by a first set of processing activities are associated with keys used by a second set of processing activities. When information regarding data collections is exchanged, one of the sets of processing activities can access the key mapping database to translate the key from the source processing activities to the key in the destination processing activities.

SUMMARY

Systems and techniques for mapping compound keys are described. In one aspect, a method includes receiving a first compound key, mapping the first compound key to a first surrogate key, mapping the first surrogate key to a second surrogate key, mapping the second surrogate key to a second compound key, and making the second compound key available for data processing activities.

This and other aspects can include one or more of the following features. The first compound key can be mapped to the first surrogate key as a unitary whole. The first compound key can be mapped to the first surrogate key by locating the first compound key in an entry in a set of mapping information, such as locating the first compound key in a row in a key mapping table.

The first compound key can be mapped to the first surrogate key by locating less than all of the components of the first compound key. For example, an unspecified key component can be located in an entry in a set of mapping information.

The first compound key can be replaced with the second compound key in a collection of data. The first compound key can be mapped to the first surrogate key by comparing positions of key components in the first compound key to position information expressly included in a set of mapping information.

In another aspect, an article includes one or more machine-readable media storing instructions operable to cause one or more machines to perform operations. The operations include receiving a first compound key, mapping the first compound key to a second key as a unitary whole by identifying an entry in a set of mapping information that includes at least two components of the first compound key in association with a second key, and making the second key available for data processing activities.

This and other aspects can include one or more of the following features. The first compound key can be mapped to the second key by identifying a row in a key mapping data table that includes the mapping information. The first compound key can be mapped to the second key by mapping the first compound key to a surrogate key. The second key can be made available by adding the second key to a message. The second key can also be made available for additional operations. The additional operations can include mapping the second key to a third key. The additional operations can also include mapping the third key to a second compound key, and making the second compound key available for additional data processing activities. The first compound key can be a nested compound key. The first compound key can be mapped to the second key by locating less than all of the components of the first compound key and an unspecified key component in an entry in a set of mapping information.

In another aspect, a memory is for storing data for access by a set of data processing activities being performed on a data processing device. The memory includes a data structure stored in the memory. The data structure includes information used by the set of data processing activities and including a collection of mapping information. The mapping information is accessible by identifying a compound key as a unitary whole in the mapping information.

This and other aspects can include one or more of the following features. The data structure can be a data table. The data table can include all components of the compound key in a row. The data table can include an unspecified key component in a row. The mapping information can include position information that expressly identifies positions of components in the component key.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
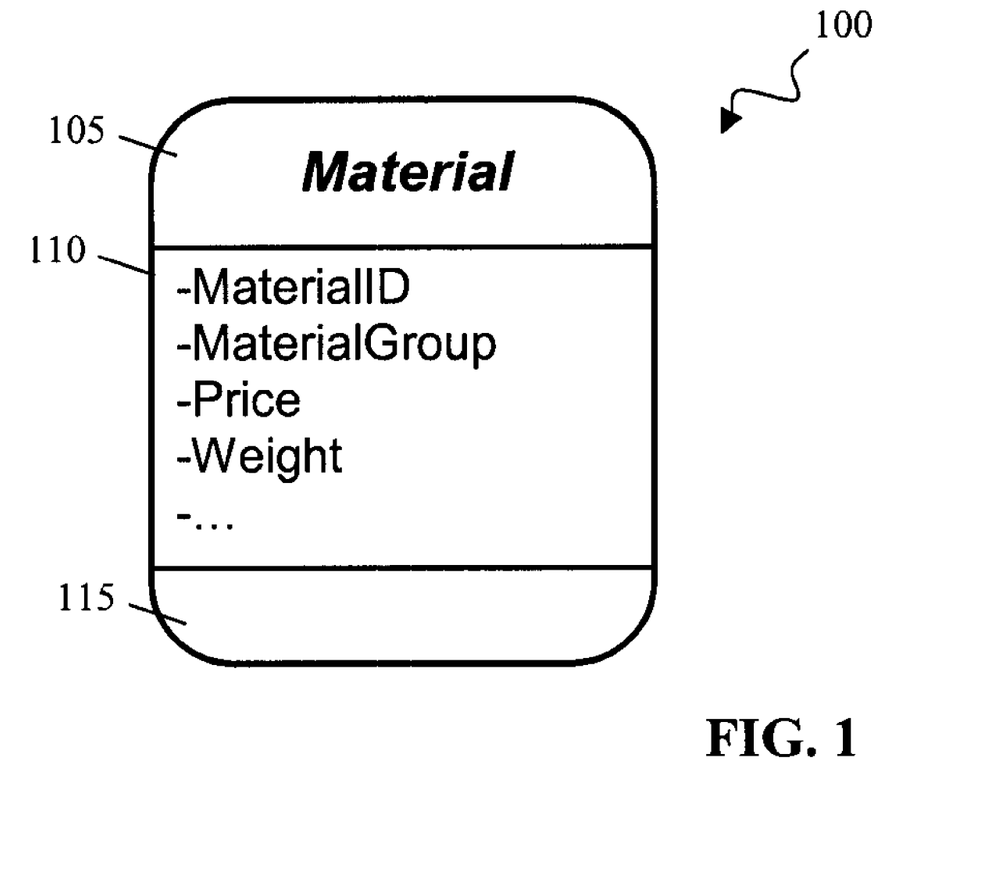
FIG. 1 is a schematic representation of an example data collection that can be identified by a compound key.

FIG. 1 is a schematic representation of an example data collection that can be identified by a compound key, namely a data object 100. Data object 100 includes an object class name 105, a collection of attributes 110, and a collection of operations 115. A data object such as data object 100 is a data collection that generally assembles information to represent a concrete or abstract real-world entity. An object can be of a certain object class, with individual objects being instances of that class. The entities represented by an object can include, e.g., a set of data processing instructions (such as a program), a data structure (such as a table), individual entries in a data structure (such as a record in a table), a data processing system, a customer, a product, a time, or a location. A data object is generally free of internal references and information stored in a data object can be changed without concomitant changes to the data processing instructions that handle the data object. In some implementations, the information in a data object can be stored in a contiguous block of memory of a specific size at a specific location, although this is not necessarily the case.

Object class name 105 is the name of the class of data object 100. For example, data object 100 is of the "Material" class and represents a real-world material entity. Attribute collection 110 includes attributes that are properties of data object 100 and have associated values that characterize the entity represented by data object 100. In particular, the attributes in collection 110 are MaterialID, MaterialGroup, Price, and Weight. These attributes have values characterizing the material represented by data object 100.

Operation collection 115 includes various data processing activities that can be performed on data object 100. The operations in collection 115 can, e.g., return a value or change a value of an attribute in collection 110, in another data object, or the like. The operations in collection 115 can also cause the creation and deletion of objects.

Data object 100, or related data objects, can be referred to by different data processing activities using different keys. The different keys can be compound keys. In some implementation, the components and organization of a compound key can follow the logical relationships set forth in a data model, although this is not always the case. For example, a compound key can follow the attributive, associative, or other relationships of a data model that includes data object 100 or other related objects.

Figure 2:
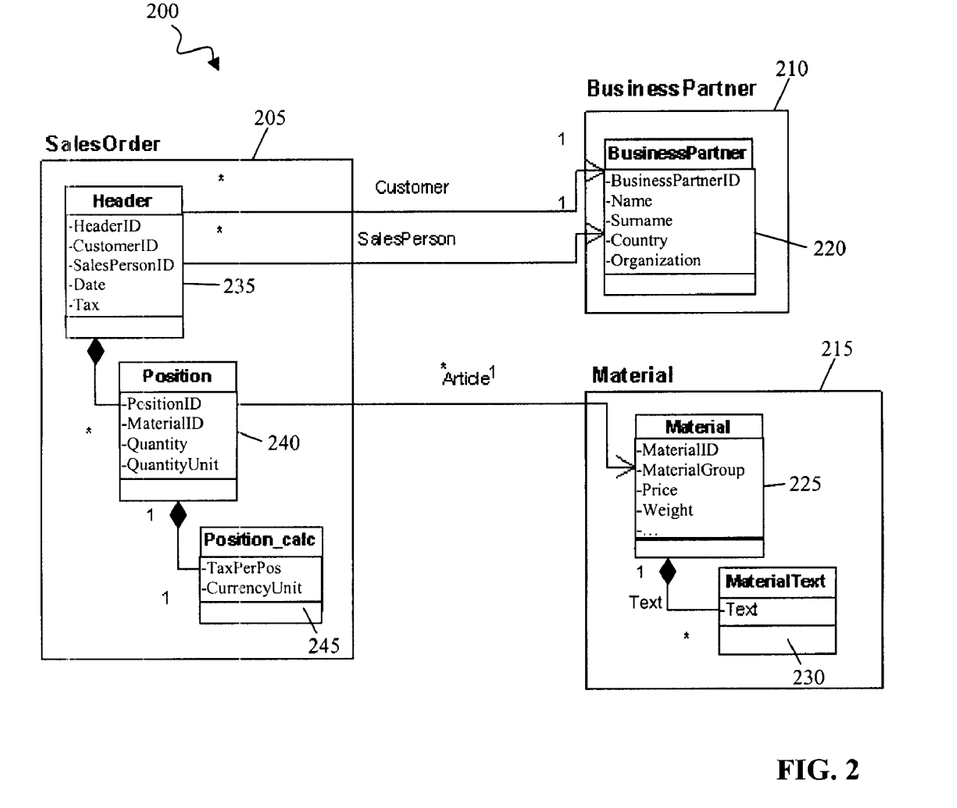
FIG. 2 shows an example data model that sets forth logical relationships between data objects.

FIG. 2 shows an example data model that sets forth logical relationships between data objects, namely a transactional data model 200. A data model is the logical and physical structure of a data store, and can include the physical storage parameters needed to implement a design. Transactional data models are generally tailored to facilitate modification of the stored data. In this regard, transactional data models generally ensure that modifications can be made quickly by using relatively small data storage structures that can be modified independently of other transactional data structures. A relatively small data storage structure is one that is comparable in size to the largest common change transaction. A change transaction is a transaction in which the stored data content is added, deleted, or otherwise changed. A transactional data model can thus include individual data objects that are comparable in size to common changes to content. For example, a transactional data model can include data objects that correspond to individual sales orders in a business, individual customers, and/or individual products.

Transactional data model 200 is a collection of business objects and the relationships between business objects. Data stored in instantiated objects within transactional data model 200 can characterize the operations of an enterprise. For example, objects within transactional data model 200 can characterize a collection of sales events. Transactional data model 200 includes a sales order package 205, a business partner package 210, and a material package 215. Business partner package 210 can include a business partner object class 220. Business partner object class 220 has a business partner identity attribute, a name attribute, a surname attribute, a country attribute, and an organization attribute.

Material package 215 can include material object class 225 and material text object classes 230. Material object class 225 has a material identity attribute, a material group attribute, a price attribute, and a weight attribute. Data object 100 (FIG. 1) is of material object class 225. During data processing activities, data object 100 (FIG. 1) can be instantiated to represent a real world material using the attributes of material object class 225. Material text object class 230 has a text attribute. Each material object class 225 can have a collection of zero or more associated material text object classes 230 in the role of "text."

Sales order package 205 can include a header object class 235, a position object class 240, and a position calculation object class 245. Header object class 235 has a header identity attribute, a customer identity attribute, a salesperson identity attribute, a date attribute, and a tax attribute. Header object class 235 is related to a first associated business partner object class 220 in the role of "customer" and to a second associated business partner object class 220 in the role of "salesperson." Header object class 235 also has a collection of zero or more associated position object classes 240.

Position object class 240 has a position identity attribute, a material identity attribute, a quantity attribute, and a quantity unit. Position object class 240 is related to one or more material object classes 225. Each position object class 240 also has an associated position calculation object class 245. Position calculation object class 245 has a "taxperpos" attribute and a currency unit attribute. Taxperpos attributes deal with the tax rate at a position.

Figure 3:
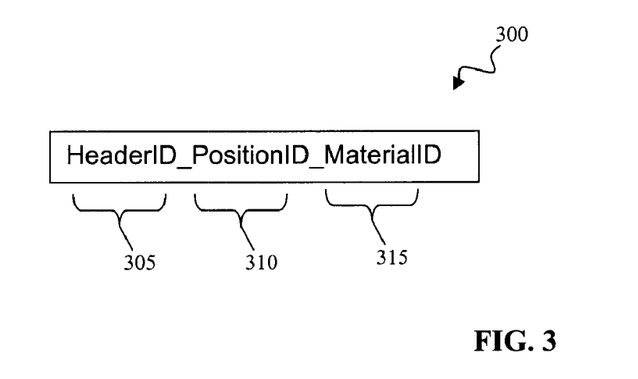
FIG. 3 is a schematic representation of a compound key.

FIG. 3 is a schematic representation of a compound key 300 that can be used to refer to a material object 100 (FIG. 1). Compound key 300 includes an ordered collection of key components 305, 310, 315 that together identify material object 100. The identification provided by the combination of key components 305, 310, 315 can be unambiguous.

Components 305, 310, 315, and their ordering within compound key 300, follow the logical relationships set forth in transactional data model 200 (FIG. 2). In particular, component 305 is a header identifier that can be drawn from the header identity attribute of a header object of class 235 in sales order package 205. Component 310 is a position identifier that can be drawn from the position identity attribute of a position object of class 240 in sales order package 205. Component 315 is a material identifier that can be drawn from the material identity attribute of material object 100, which is of class 225 in material package 215.

Figure 4:
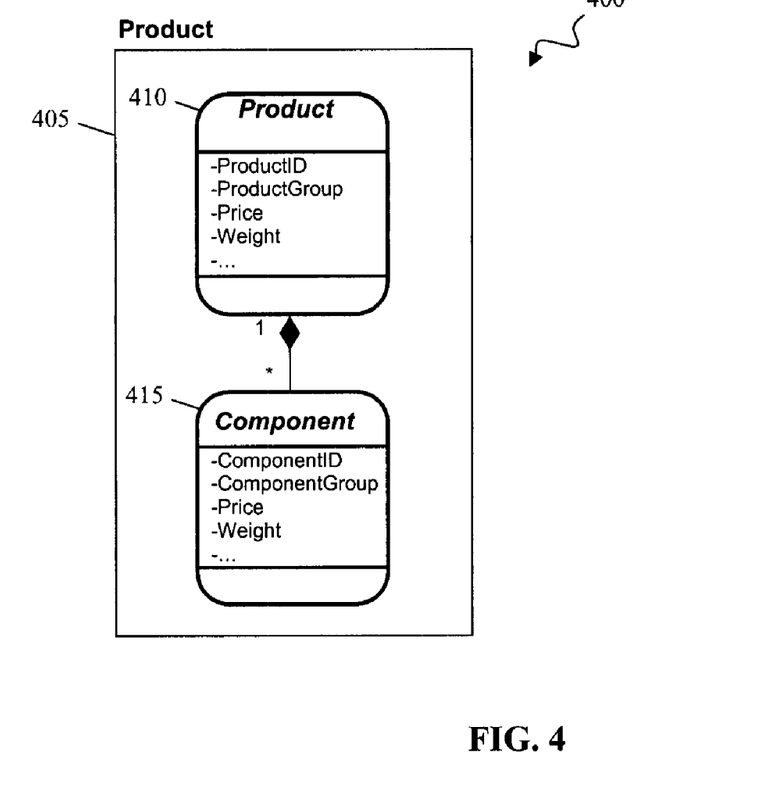
FIG. 4 is a schematic representation of a transactional data model

FIG. 4 is a schematic representation of another example data model, namely a transactional data model 400. Data stored in instantiated objects within transactional data model 400 can characterize the operations of an enterprise. For example, objects within transactional data model 400 can characterize a product. Transactional data model 400 includes a product 405. Product 405 can include a product object class 410 and a component class 415.

Product object class 410 has a product identity attribute, a product group attribute, a price attribute, and a weight attribute. Each product object class 410 has a collection of zero or more associated component class 415. Component 415 has a component identity attribute, a component group attribute, a price attribute, and a weight attribute.

Figure 5:
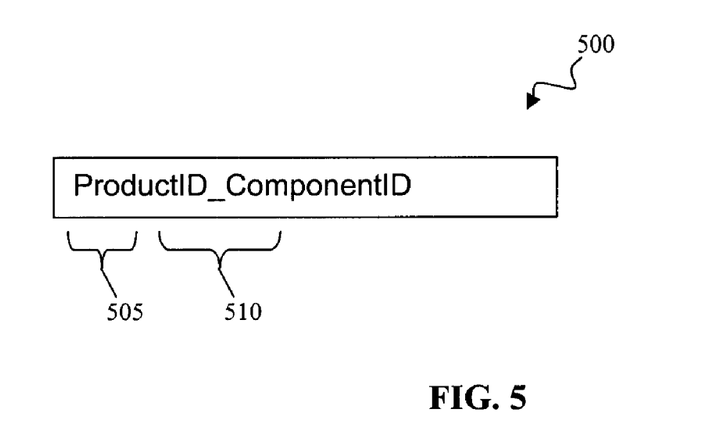
FIG. 5 is a schematic representation of a compound key.

FIG. 5 is a schematic representation of a compound key 500 that can be used to refer to a component object. Compound key 500 includes an ordered collection of key components 505, 510 that together identify the component object. The identification provided by the combination of key components 505, 510 can be unambiguous.

Components 505, 510, and their ordering within compound key 500, follow the logical relationships set forth in transactional data model 400 (FIG. 4). In particular, component 505 is a product identifier that can be drawn from the product identity attribute of a product object of class 410 in product package 405. Component 410 is a component identifier that can be drawn from the component identity attribute of a component object of class 415 in product package 405.

Figure 6:
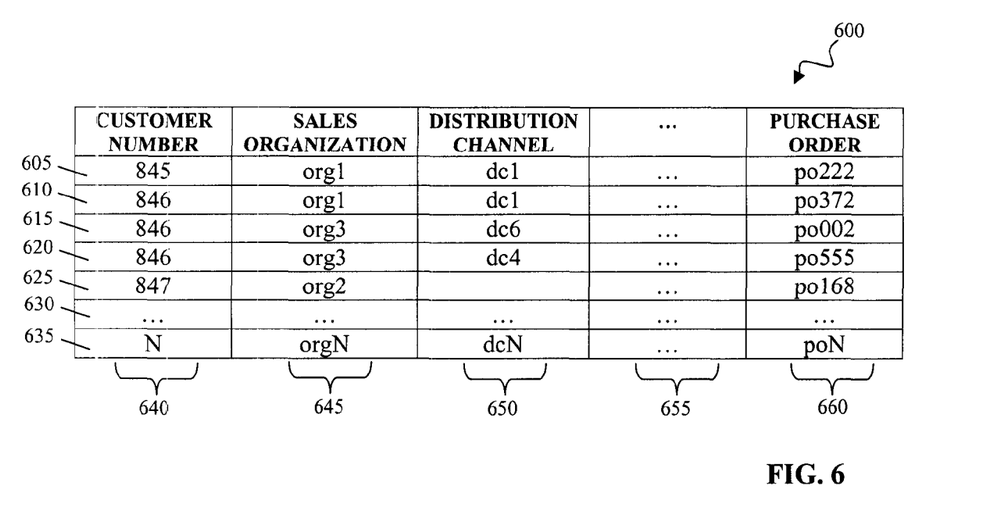
FIG. 6 is a schematic representation of example data collections that can be identified by compound keys.

FIG. 6 is a schematic representation of example data collections that can be identified by compound keys, namely, the row of a data table 600. Data table 600 organizes information in a collection of rows 605, 610, 615, 620, 625, 630, 635 and columns 640, 645, 650, 655, 660. Column 640 includes customer numbers associated with the records of rows 605, 610, 615, 620, 625, 630, 635. Column 645 includes information identifying the sales organizations associated with the records of rows 605, 610, 615, 620, 625, 630, 635. Column 650 includes information identifying the distribution channels associated with the records of rows 605, 610, 615, 620, 625, 630, 635. Column 660 includes information identifying the purchase orders associated with the records of rows 605, 610, 615, 620, 625, 630, 635. One or more column 655 can include additional information associated with the records of rows 605, 610, 615, 620, 625, 630, 635.

Figure 7:
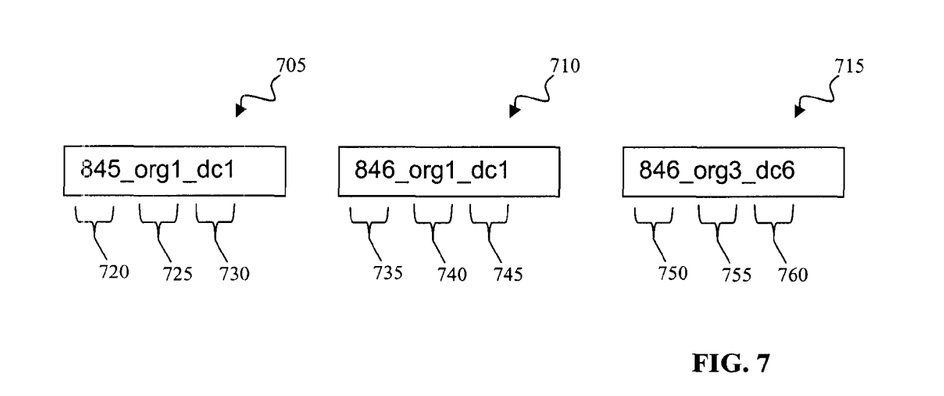
FIG. 7 is a schematic representation of three different compound keys.

FIG. 7 is a schematic representation of three different compound keys 705, 710, 715 that can each be used to refer to a respective row 605, 610, 615 of data table 600 (FIG. 15). Compound keys 705, 710, 715 each includes an ordered collection of key components that together uniquely identify one of rows 605, 610, 615. In particular, compound key 705 includes an ordered collection of key components 720, 725, 730 that uniquely identifies row 605. Compound key 710 includes an ordered collection of key components 735, 740, 745 that uniquely identifies row 610. Compound key 715 includes an ordered collection of key components 750, 755, 760 that uniquely identifies row 615.

As illustrated, components 720, 725, 730, 735, 740, 745, 750, 755, 760, and their ordering within compound keys 705, 710, 715, are based on the contents and ordering of information in columns 640, 645, 650 of data table 600 (FIG. 6). This is true even when there is not a strict correspondence between the column contents and compound key components. For example, the order of components in compound keys can differ from the arrangement of columns of a data table from which the components are drawn. As another example, the key components can be derived from column contents using a rule or other logic that ends the strict correspondence but yet leaves the key components based on column contents.

Figure 8:
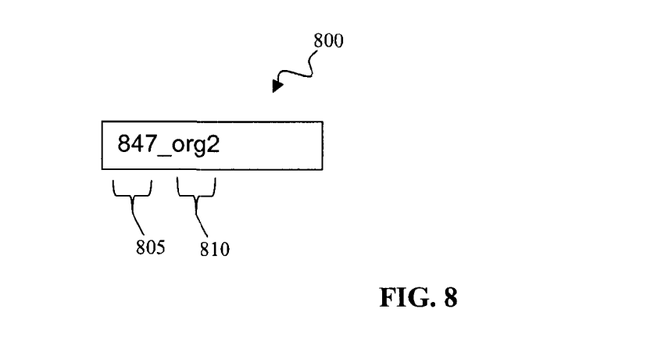
FIG. 8 is a schematic representation of a compound key.

In some implementations, the contents of a data table are not complete. For example, as illustrated in FIG. 6, row 625 does not include an entry in distribution channel column 650. FIG. 8 is a schematic representation of a compound key 800 that can be used to refer to such a row 625 of data table 600 (FIG. 6). Compound key 800 includes an ordered collection of key components 805, 810 that together uniquely identify row 625 so long as table 600 does not include another row with contents that are identical to the contents of row 625 in columns 640, 645.

Figure 9:
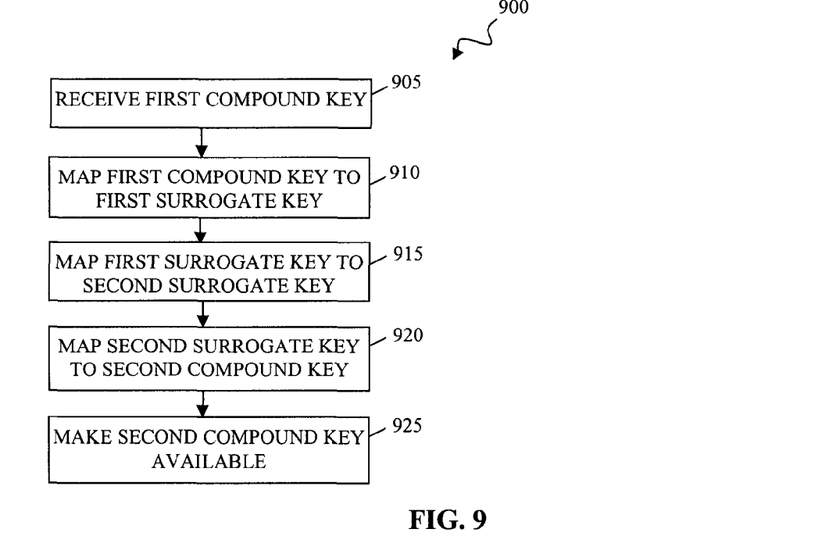
FIG. 9 is a flowchart of a process for mapping compound keys.

FIG. 9 is a flowchart of a process 900 for mapping compound keys. Process 900 can be performed by one or more data processing systems in accordance with the logic of one or more sets of machine-readable instructions.

The system(s) performing process 900 can receive a first compound key at 905. The first compound key can be received from a different entity (e.g., a different application, module, data processing system, data processing system landscape, and/or public identification scheme entity) or from other data processing activities performed by the system performing process 900. The first compound key can be received, e.g., in a collect ion of data such as a document or a message.

The system(s) performing process 900 can map the first compound key to a first surrogate key at 910. A surrogate key is a key that has been established to identify a specific entity in a specific context. For example, the surrogate keys in process 900 can be established to identify compound keys in the key-mapping context. Since surrogate keys are established for a specific context, surrogate keys often lack any significance outside of that context. For example, surrogate keys can be established by serially assigning integer numerals to compound keys. The integer numbers need not have any meaning outside of the context of key-mapping and need not appear in data processing activities other than key mapping.

The mapping of the first compound key to the first surrogate key can include identifying the correspondence between the first compound key and the first surrogate key. The correspondence can be identified in a number of different ways. For example, a look-up in a key-mapping table or database can be performed. As another example, a rule can be used to generate the first surrogate key from the first compound key.

In some implementations, the mapping can include applying that correspondence in one or more data processing activities. For example, the first compound key can be replaced with the first surrogate key in a collection of data such as a document or a message.

The system(s) performing process 900 can map the first surrogate key to a second surrogate key at 915. The mapping of the first surrogate key to the second surrogate key can include identifying the correspondence between the first surrogate key and the second surrogate key. In some implementations, the mapping can include applying that correspondence in one or more data processing activities.

The system(s) performing process 900 can map the second surrogate key to a second compound key at 920. The mapping of the second surrogate key to the second compound key can include identifying the correspondence between the second surrogate key and the second compound key. In some implementations, the mapping can include applying that correspondence in one or more data processing activities.

The system(s) performing process 900 can make the second compound key available at 925. The first compound key can be made available to a different entity (e.g., a different application, module, data processing system, data processing system landscape, and/or public identification scheme entity) or to other data processing activities performed by the system performing process 900. The first compound key can be made available, e.g., in a collection of data such as a document or a message.

Figure 10:
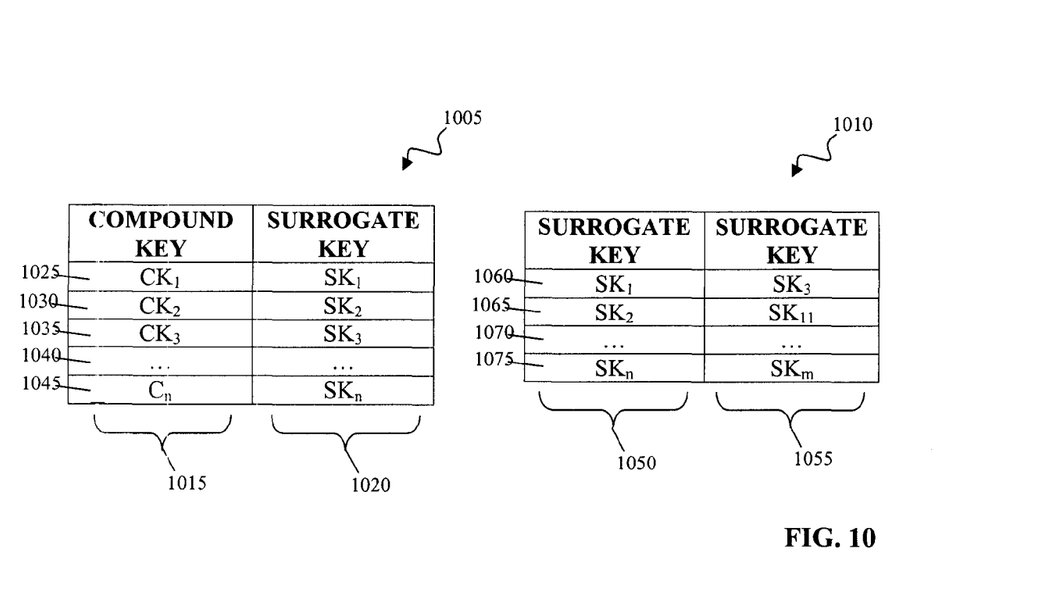
FIG. 10 is a schematic representation of a pair of key-mapping data tables.

FIG. 10 is a schematic representation of a pair of key-mapping data tables 1005, 1010 that include mapping information that can be used to identify the correspondence between keys. In particular, key-mapping table 1005 can be used to identify the correspondence between compound keys and surrogate keys, such as at 910, 920 in process 900 (FIG. 9). Mapping table 1010 can be used to identify the correspondence between different surrogate keys, such as at 915 in process 900 (FIG. 9).

Key-mapping table 1005 includes a pair of columns 1015, 1020 that associate corresponding compound keys and surrogate keys in one or more rows 1025, 1030, 1035, 1040, 1045. Key-mapping table 1010 includes a pair of columns 1050, 1055 that associate pairs of corresponding surrogate keys in one or more rows 1060, 1065, 1070, 1075.

One or more data processing devices can use collections of key-mapping information (such as tables 1005, 1010) in the performance of process 900 (FIG. 9). For example, the first compound key can be mapped to a first surrogate key by identifying the row 1025, 1030, 1035, 1040, 1045 in a table such as table 1005 that includes the first compound key in column 1015. This identification can be performed using the first compound key as a unitary entity, i.e., the entire first compound key is used to identify the appropriate row 1025, 1030, 1035, 1040, 1045. The constituent components of the compound key need not individually mapped to corresponding components and then later reassembled into a compound surrogate key.

Once the row 1025, 1030, 1035, 1040, 1045 that includes the first compound key in column 1015 is identified, the corresponding surrogate key in column 1020 can be used by one or more data processing devices to identify the row 1060, 1065, 1070, 1075 in a table such as table 1010 that includes the surrogate key from column 1020 in column 1050. Such an identification maps the surrogate key from column 1020 (i.e., the first surrogate key of process 900 (FIG. 9)) to the surrogate key in column 1055 (i.e., the second surrogate key of process 900 (FIG. 9)).

The surrogate key from column 1055 can be used by one or more data processing devices to identify the row 1025, 1030, 1035, 1040, 1045 in a table such as table 1005 that includes the surrogate key from column 1055 in column 1020. Such an identification maps the surrogate key from column 1055 (i.e., the second surrogate key of process 900 (FIG. 9)) to a compound key in column 1015 (i.e., the second compound key of process 900 (FIG. 9)).

The second compound key in column 1015 is identified as a unitary entity, i.e., the entire second compound key is available in the appropriate row 1025, 1030, 1035, 1040, 1045. The second compound key need not be reassembled from constituent components identified by individually mapping components of the first compound key.

Figures 11, 12:
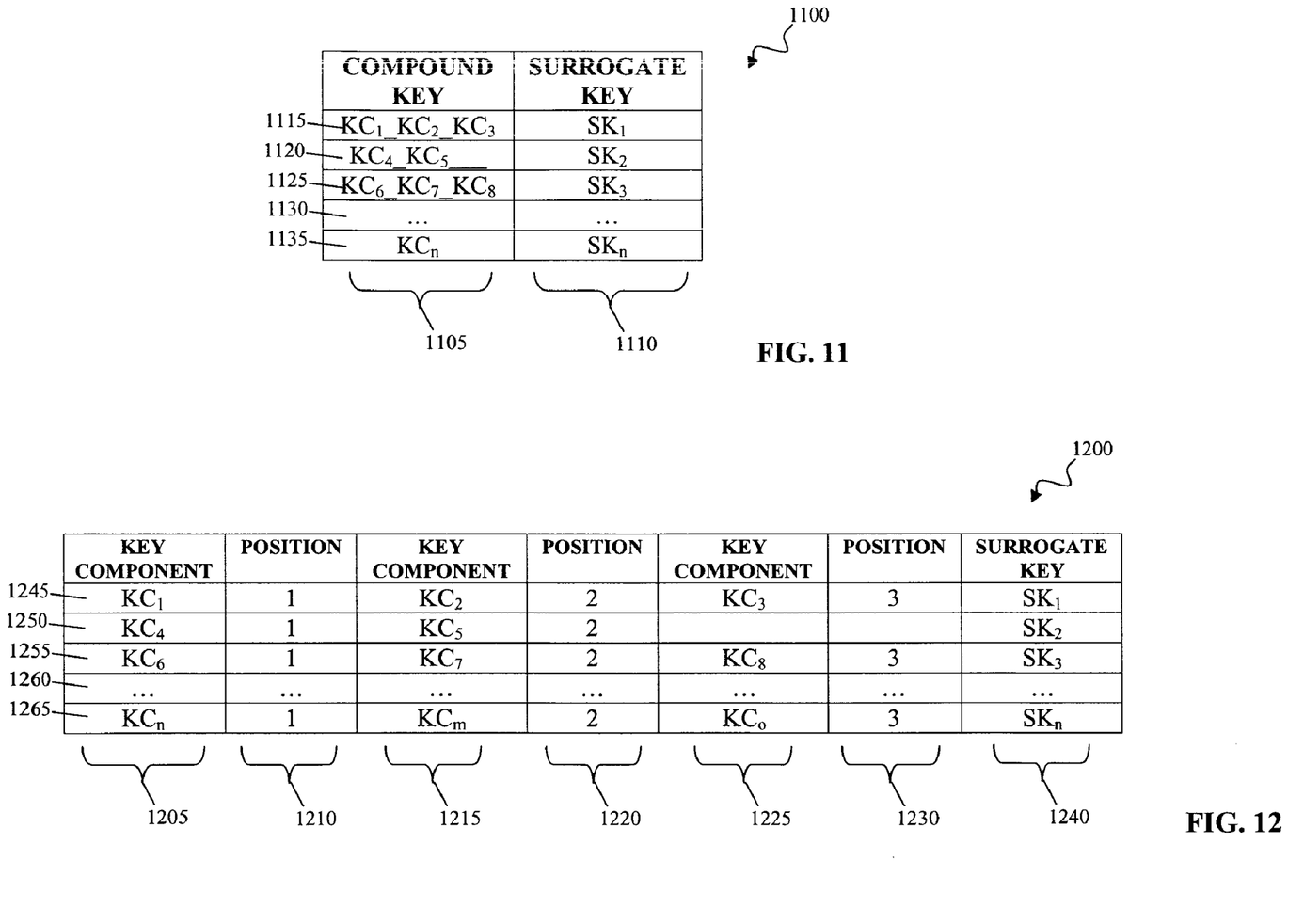
FIG. 11 is a schematic representation of a key-mapping data table.
FIG. 12 is a schematic representation of a key-mapping data table.

FIG. 11 is a schematic representation of a key-mapping data table 1100 that can be used to identify the correspondence between keys. In particular, key-mapping table 1100 can be used to identify the correspondence between compound keys and surrogate keys, such as at 910, 920 in process 900 (FIG. 9).

Key-mapping table 1100 includes a pair of columns 1105, 1110 that associate corresponding compound keys and surrogate keys in one or more rows 1115, 1120, 1125, 1130, 1135. Column 1105 of row 1120 includes a compound key "$KC_4\_KC_5\_$" that includes an unspecified key component "_." The unspecified key component can be classified as "default key" alias "value independent."

An unspecified key component is a component of a compound key that, for one reason or another, does not have a unique assigned value. Key components can remain unspecified for any of a number of different reasons. For example, suppose that a compound key type is defined to include a number "X" components. One or more of the "X" components may be unnecessary or even undesirable to include in key mapping or other data processing activities.

A practical example of this is a three component compound key where one key component is drawn from a package size. This package size may be a consequence of the peculiarities of the plant where the package is produced but otherwise irrelevant to key mapping and other data processing activities. The component related to package size can thus be omitted from key mapping activities.

One or more data processing devices can use key-mapping data table 1100, including compound keys that include an unspecified key component, in the performance of process 900 (FIG. 9). For example, one or more data processing devices can receive compound keys "$KC_4\_KC_5\_KC_{11}$," "$KC_4\_KC_5\_KC_{12}$," and "$KC_4\_KC_5\_KC_{13}$." With the compound key in column 1105 of row 1120 including an unspecified key component "_," all of these keys can be mapped to the first surrogate key of row 1120, column 1110. As before, these compound keys are mapped to the first surrogate key as a unitary entity. The first surrogate key can be used to map a second surrogate key and, in turn, to a second compound key, as discussed above.

FIG. 12 is a schematic representation of a key-mapping data table 1200 that can be used to identify the correspondence between keys. In particular, key-mapping table 1200 can be used to identify the correspondence between compound keys and surrogate keys, such as at 910, 920 in process 900 (FIG. 9).

Key-mapping table 1200 includes columns 1205, 1210, 1215, 1220, 1225, 1230, 1240 that associate corresponding compound keys and surrogate keys in one or more rows 1245, 1250, 1255, 1260, 1265. Each of rows 1245, 1250, 1255, 1260, 1265 includes information identifying the components of a compound key in columns 1205, 1215, 1225, along with information identifying the position of the components in the compound key in columns 1210, 1220, 1230. Such position information need not be expressly included in key-mapping table 1200 as shown. For example, position information can be encoded in key-mapping table 1200 by, e.g., the order of columns 1205, 1215, 1225 in key-mapping table 1200 or the like.

In some implementations, key-mapping table 1200 can include unspecified key components. For example, column 1225 of row 1250 includes unspecified key component. The unspecified key component can be classified and used as discussed above.

One or more data processing devices can use key-mapping 1200 in the performance of process 900 (FIG. 9). For example, one or more data processing devices can receive and map a first compound key to a first surrogate key by identifying the row 1245, 1250, 1255, 1260, 1265 in a table such as table 1200 that includes the components identified in columns 1205, 1215, 1225 in the positions identified in columns 1210, 1220, 1230. As before, this identification can be performed using the first compound key as a unitary entity, i.e., the entire first compound key is used to identify the appropriate row 1245, 1250, 1255, 1260, 1265. Although the first compound key is broken down into constituent components, the constituent components are not individually mapped to corresponding components that are later reassembled into a compound surrogate key.

In some implementations, using the systems and techniques describe herein, there is no need for key types to be predefined. A key type is a model of the structure of a key and commonly specifies the number and nature of the components, along with their order, in instances of keys of that type. However, using the described systems and techniques, keys can be mapped regardless of the number of components.

Figure 13:
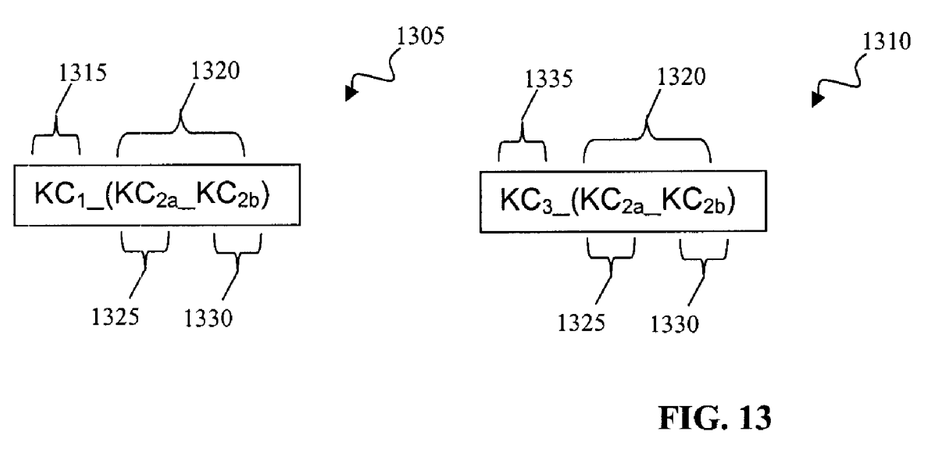
FIG. 13 is a schematic representation of two nested compound keys.

FIG. 13 is a schematic representation of two example implementations of a specific category of a compound key, namely, nested compound keys 1305, 1310. Nested compound key 1305 includes a first component 1315 and a second component 1320. Second component 1320 is itself a compound key and includes a component 1325 and a component 1330. Nested compound key 1310 includes a first component 1335 and the same second component 1320 as compound key 1305.

Nested compound keys 1305, 1310 can be mapped using the systems and techniques described above. For example, entries in column 1015 of key-mapping table 1005 (FIG. 10), column 1105 of key-mapping table 1100 (FIG. 11), and/or in columns 1205, 1215, 1225 (FIG. 12) can include nested compound keys 1305, 1310 or components 1315, 1325, 1330, 1335.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. For example, key mapping information can be stored in any of a variety of different data structures and/or rules. Accordingly, other implementations are within the scope of the following claims.

What is claimed is:

1. A method for implementation by one or more data processors comprising:
    receiving, by at least one data processor, a first compound key identifying a data object in a transactional data model, the transactional data model comprising a collection of data objects and characterizing relationships among the data objects;
    mapping, by at least one data processor, the first compound key to a first surrogate key;
    mapping, by at least one data processor, the first surrogate key to a second surrogate key;
    mapping, by at least one data processor, the second surrogate key to a second compound key identifying the data object; and
    making, by at least one data processor, the second compound key available for data processing activities;
    wherein each compound key includes an ordered collection of two or more components that together identify a data assembly;
    wherein mapping the first compound key to the first surrogate key comprises locating less than all of the components of the first compound key;
    wherein mapping the first compound key to the first surrogate key comprises locating an unspecified key component in an entry in a set of mapping information;
    wherein a first data processing activity refers to the data object using the first compound key and a second data processing activity refers to the data object using the second compound key;
    wherein the first compound key is not directly mapped to the second compound key.

2. The method of claim 1, wherein mapping the first compound key to the first surrogate key comprises mapping, by at least one data processor, the first compound key as a unitary whole.

3. The method of claim 1, wherein mapping the first compound key to the first surrogate key comprises locating, by at least one data processor, the first compound key in an entry in a set of mapping information.

4. The method of claim 3, wherein locating the first compound key comprises locating, by at least one data processor, the first compound key in a row in a key mapping table.

5. The method of claim 1, further comprising replacing, by at least one data processor, the first compound key with the second compound key in a collection of data.

6. The method of claim 1, wherein mapping the first compound key to the first surrogate key comprises comparing, by at least one data processor, positions of key components in the first compound key to position information expressly included in a set of mapping information.

7. An article comprising one or more non-transitory machine-readable media storing instructions operable to cause one or more machines to perform operations comprising:
- receiving a first compound key identifying a data object in a transactional data model, the transactional data model comprising a collection of data objects and characterizing relationships among the data objects, wherein the first compound key includes an ordered collection of two or more components that together identify a data assembly;
- mapping the first compound key to a second key that identifies the data object, the mapping being as a unitary whole by identifying an entry in a set of mapping information that includes at least two components of the first compound key in association with a second key; and
- making the second key available for data processing activities;
- wherein the mapping the first compound key to the second key comprises identifying a row in a key mapping data table that includes the mapping information;
- wherein each of the at least two components are in separate columns of the row of a key mapping table.

8. The article of claim 7, wherein the mapping the first compound key to the second key comprises mapping the first compound key to a surrogate key.

9. The article of claim 7, wherein making the second key available comprises adding the second key to a message.

10. The article of claim 7, wherein making the second key available comprises making the second key available for additional operations, the additional operations comprising mapping the second key to a third key.

11. The article of claim 10, wherein the additional operations further comprise:
- mapping the third key to a second compound key; and
- making the second compound key available for additional data processing activities.

12. The article of claim 7, wherein at least one component of the first compound key is a nested compound key, wherein the nested compound key in turn refers to two or more components that together identify a second data assembly.

13. The article of claim 7, wherein mapping the first compound key to the second key comprises locating less than all of the components of the first compound key and an unspecified key component in an entry in a set of mapping information.

14. A method for implementation by one or more data processors comprising:
- receiving, by at least one data processor, a first compound key identifying a data object in a transactional data model, the transactional data model comprising a collection of data objects and characterizing relationships among the data objects;
- mapping, by at least one data processor, the first compound key to a first surrogate key, the mapping of the first compound key to the first surrogate key identifying correspondence between the first compound key and the first surrogate key;
- mapping, by at least one data processor, the first surrogate key to a second surrogate key, the mapping of the first surrogate key to the second surrogate key identifying correspondence between the first surrogate key and the second surrogate key;
- mapping, by at least one data processor, the second surrogate key to a second compound key that identifies the data object, the mapping of the second surrogate key to the second compound key identifying correspondence between the second surrogate key and the second compound key; and
- making, by at least one data processor, the second compound key available for data processing activities;
- wherein each compound key includes an ordered collection of two or more components that together identify a data assembly;
- wherein mapping the first compound key to the first surrogate key comprises comparing positions of key components in the first compound key to position information expressly included in a set of mapping information;
- wherein the data processing activities using the second compound key differ from data processing activities using the first compound key;
- wherein the first compound key is not directly mapped to the second compound key.

15. A method as in claim 1, wherein placement of each component in each compound key are based on a logical relationship defined by a corresponding transaction data model.

* * * * *